United States Patent
Thimon

[11] Patent Number: 4,767,578
[45] Date of Patent: Aug. 30, 1988

[54] METHOD AND DEVICE FOR THE CONTINUOUS STRETCHING OF A PLASTICS MATERIAL FILM

[75] Inventor: Hubert A. Thimon, Aix les Bains, France

[73] Assignee: Newtec International, Aix les Bains, France

[21] Appl. No.: 786,197

[22] Filed: Oct. 10, 1985

[30] Foreign Application Priority Data

Oct. 11, 1984 [FR] France .................. 84 15587

[51] Int. Cl.$^4$ .................. B29C 55/06; B29D 7/01
[52] U.S. Cl. .................. 264/40.1; 26/71; 100/162 R; 100/168; 100/176; 264/235.6; 264/288.4; 264/DIG. 73; 425/145; 425/367
[58] Field of Search .............. 264/235.6, 288.4, 290.2, 264/DIG. 73, 40.7, 40.1; 26/71, 72; 425/367, 145; 100/162 R, 168, 176

[56] References Cited

U.S. PATENT DOCUMENTS

| 2,142,718 | 1/1939 | Dreyfus | 264/288.4 X |
| 3,076,232 | 2/1963 | Dengler | 264/288.4 X |
| 3,208,100 | 9/1965 | Nash | 264/288.4 X |
| 4,408,974 | 10/1983 | Comerio | 264/288.4 X |
| 4,654,180 | 3/1987 | Herrington | 26/71 X |

FOREIGN PATENT DOCUMENTS 2635585 8/1976 Fed. Rep. of Germany .
456933 7/1968 Switzerland .

Primary Examiner—Jeffery Thurlow
Assistant Examiner—Leo B. Tentoni
Attorney, Agent, or Firm—Kenyon & Kenyon

[57] ABSTRACT

The invention relates to a method for the continuous stretching of a plastics material film, of the type where the film is run off in engagement with two successive rollers which are driven at different tangential speeds, the second roller having a tangential speed which is greater than that of the first roller. The film is run off in engagement with at least a third roller, arranged downstream of the second roller and driven at a tangential speed which is greater than that of the second roller, and it is possible to select as required those of the three rollers in engagement with the film.

38 Claims, 4 Drawing Sheets

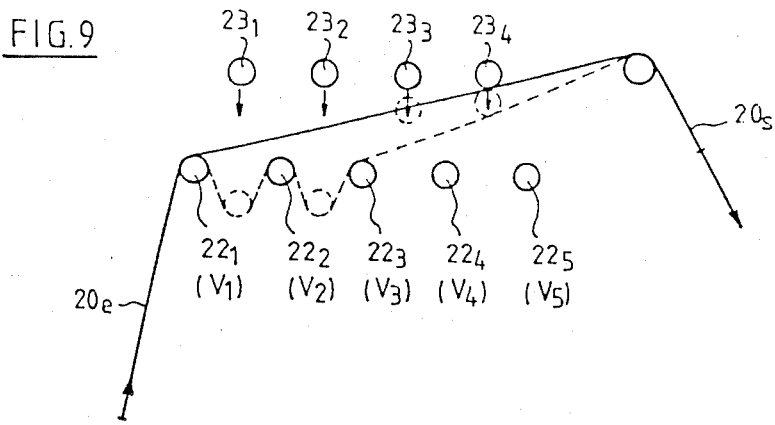
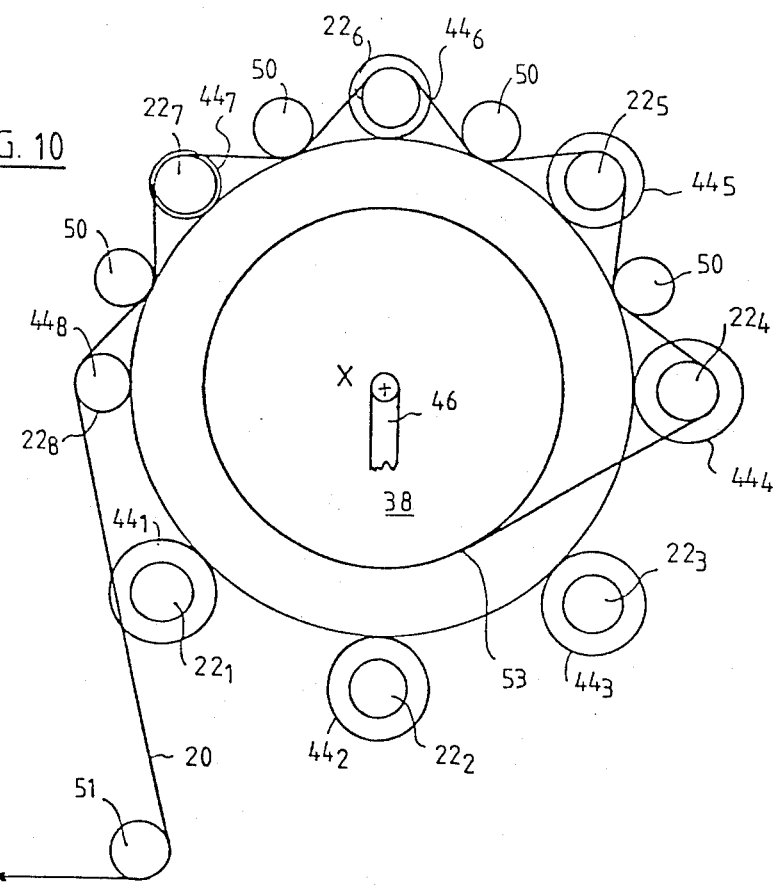

METHOD AND DEVICE FOR THE CONTINUOUS STRETCHING OF A PLASTICS MATERIAL FILM

The present invention relates to a method and a device for the continuous stretching of a plastics material film.

In many areas of use, in particular for wrapping loads, plastics material films are used which are stretched longitudinally, mainly in order to economise on the material.

Methods and devices are known wherein the film is run off in engagement with two successive rollers driven at different tangential speeds, the second roller—in the direction of running off of the film—having a tangential speed which is greater than that of the first roller.

In a simple embodiment of the known device, a single motor drives the two rollers by means of a gearing transmission. The disadvantage of this device is that the stretching ratio is determined by the transmission characteristics.

When different stretching ratios are required, for example when using films made of different materials, it is of course possible to provide a transmission with a plurality of speeds.

However, in certain areas of use it is necessary to obtain a variable stretching ratio from the value—i.e. an unwinding of the film without sretching—up to a given value R. In this case, multi-speed transmissions cannot be used.

In Patent Application FR No. 82 18145, a device is described wherein the two rollers are driven at constant angular speeds and their working diameters are varied, so as to vary their respective tangential speeds from the value 1 to a given value E.

Although these devices provide particularly satisfactory results, they are relatively expensive to manufacture, particularly on account of the mechanism which ensures the variation of the respective working diameters of the two rollers.

The object of the present invention is thus to propose a method and a device which allows for a variation in the stretching ratio between predetermined values and which at the same time have a simple, robust design, which is not cumbersome.

To this end, the present invention proposes a method of longitudinally stretching a plastics material film, wherein the film is run off in engagement with two successive rollers driven at different tangential speeds, the speed of the second roller being greater than that of the first roller, characterised in that the film is also run off in engagement with a third roller driven at a third tangential speed, and it is possible to select as required those of the above rollers in engagement with the film.

In this manner, if the three respective tangential speeds of the rollers are designated by $V_1$, $V_2$ and $V_3$, in the relationship $V_1 < V_2 < V_3$, it is possible to obtain the following different stretching ratios: 1 when a single roller is engaged with the film $V_2/V_1$ or $V_3/V_2$ when two rollers are engaged with the film, and finally $V_3/V_1$ when the three rollers are engaged with the film.

It is understood that a variation of the stretching ratio is thus obtained which is not continuous but which is by successive degrees and which is quite satisfactory in many areas of use on account of a particularly simple arrangement. In fact, since each roller has a given tangential speed, it is possible to provide rollers with fixed diameters which are driven by a single-speed transmission and which have an economical, reliable and robust design.

It is of course possible to provide a number of rollers n which is greater than three and the invention proposes a device which is particularly advantageous in ensuring the drive of all rollers by a single motor.

The invention will be more clearly understood from the following description with reference to the attached drawings, in which:

FIG. 9 is a partially diagramatic view of a further embodiment of the invention; and FIG. 10 is a variation of the embodiment of FIG. 2.

Figure 1:
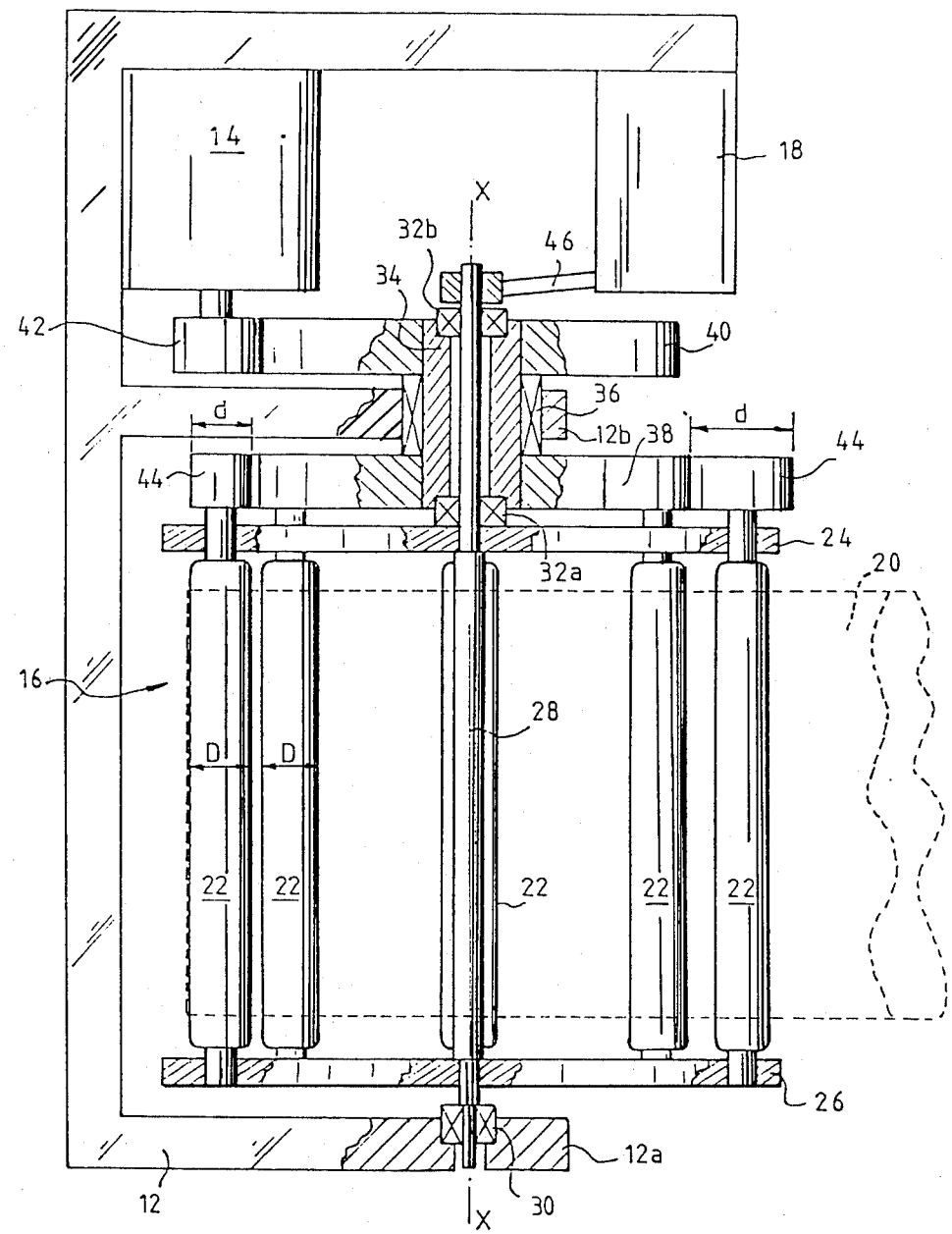
FIG. 1 is a side view, partially in elevation and partially in longitudinal section of a device according to the invention.

FIG. 1 shows an embodiment of a device according to the invention, comprising a frame 12, on which a drive motor 14, a stretching apparatus 16, and a variator 18 are mounted. As shown by a dotted line, the said device is designed to axially stretch a plastics material film 20.

The stretching apparatus 16 comprises a certain number of parallel cylindrical rollers 22, arranged at approximately regular intervals about a main axis XX. In the embodiment shown, there are 8 (eight) rollers 22, only 5 (five) of which are visible, being behind the plane of section.

The rollers 22 pivot in two radial side plates 24, 26 which are integrally formed with a variator shaft 28 centered on the axis XX and rotatably mounted per se on the frame 12, on the one hand directly at its lower end by means of a bearing 30 mounted in a branch 12a of the frame, and on the other hand indirectly at its upper end by means of bearings 32a, 32b mounted in a cylindrical bush 34 which crosses a branch 12b of the frame with an interposed bearing 36.

The bush 34 is integrally formed with two toothed wheels, one of which 38 is adjacent to the upper side plate 24 and is referred to as the drive wheel and the other 40 is arranged beyond the branch 12b and is referred to as the motor wheel.

The motor wheel 40 meshes with an output pinion 42 of the motor 14.

The drive wheel 38 meshes with pinions 44 integral with the rollers 22 in a manner which is explained below.

Finally, the shaft of the variator 28 extends beyond the pinion 34 and is rigidly connected to a variator lever 46 actuated by the variator 18.

As shown in FIGS. 1 and 2 to 4, in this embodiment, the rollers 22 all have the same diameter D, whereas the pinions 44 of the rollers 22 have different diameters $d_1$, $d_2 \ldots d_8$. More particularly, these diameters are in the relationship:

$$d_8 < d_7 < d_6 < d_5 < d_4 = d_3 = d_2 = d_1,$$

such that, when the motor is operating, the rollers have different tangential speeds according to the relationship:

$$V_8 > V_7 > V_6 > V_5 > V_4 = V_4 = V_3 = V_2 = V_1.$$

If we consider the film 20, which is wound over a sector of approximately 180° of the rollers 22, from the input 20e to the output 20s, it can be determined that, depending on the position imparted to the side plates 24, 26 by the variator 18, the film comes into contact with 4 or 5 successive rollers out of the eight rollers, the said rollers thus having a fixed axis.

Figure 2:
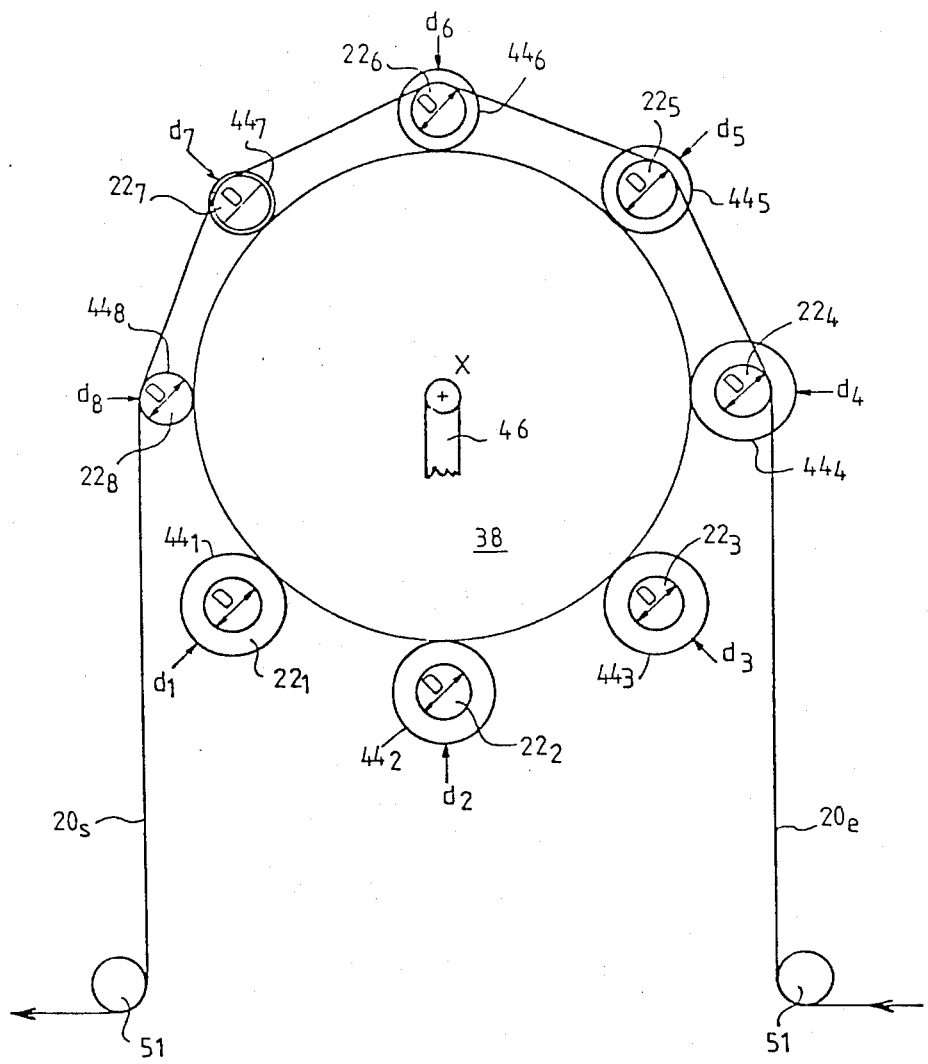
FIGS. 2, 3, 4 and 5 are diagramatic views showing four successive stages of the operation of the device.
Figure 3:
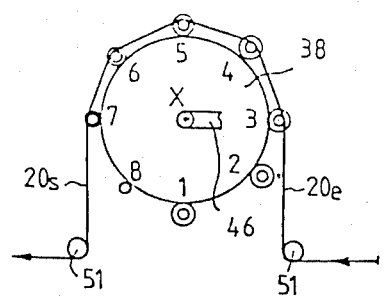

According to the position in FIG. 2, the film is in contact with the rollers $22_8$, $22_7$, $22_6$, $22_5$ and $22_4$ and consequently its running off speed alters successively from its input to its output from $V_4$, to $V_5$, $V_6$, $V_7$ then $V_8$ which leads to a longitudinal stretching of the film with a ratio $V_8/V_4$ or $d_4/d_8$.

If the position is changed a first time (FIG. 3), the film comes into contact with the rollers $22_7$, $22_6$, $22_5$, $22_4$ and $22_3$. Since the tangential speed of the roller $22_3$ is equal to that of the roller $22_4$, the stretching ratio is equal to $V_7/V_4$, or $d_4/d_7$ and is thus less than the preceding ratio since $d_7$ is greater than $d_8$.

Figure 4:
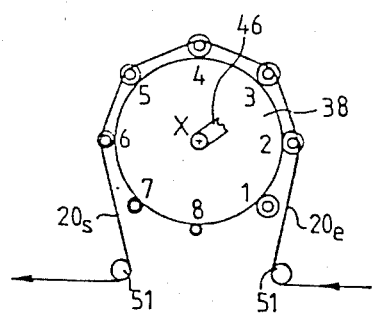
Figure 5:
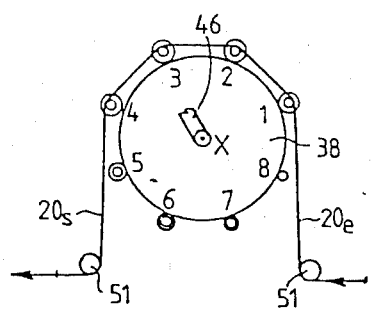

According to the position in FIG. 4, the stretching ratio is only $d_4/d_6$, and finally, according to the position in FIG. 5, the film is in contact with the rollers $22_4$, $22_3$, $22_2$ and $22$ only, the tangential speeds of which are equal and the stretching ratio is equal to 1/1. In other words, there is no longer any stretching in this situation.

It can be seen that the invention discloses a simple manner of passing gradually from one stretching ratio 1/1 to a given stretching ratio in areas of use where it is necessary to obtain a variation in stretching of this type, as for example hoop-casing loads in the field of wrapping.

The invention can of course be the subject of numerous variations.

Figure 6:
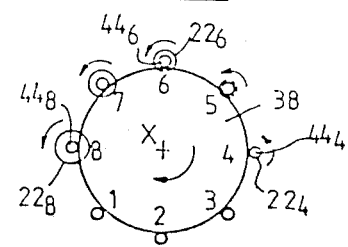
FIG. 6 is a view similar to that of FIGS. 2 to 5, showing a further variation of the device.

For example, in FIG. 6 the pinions of the rollers 22 all have the same diameter d, whereas the rollers per se have different diameters:

$$D_8 > D_7 > D_6 > D_5 > D_4 = D_3 = D_2 = D_1.$$

Figure 7:
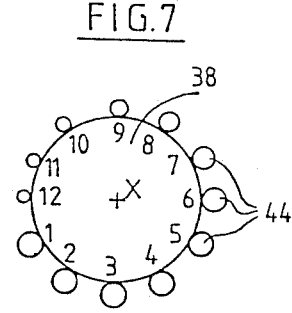
FIG. 7 is a view similar to that of the preceding figure, showing a further variation of the device.

Similarly, the number of rollers may differ from eight. FIG. 7 shows an embodiment having twelve rollers.

Figure 8:
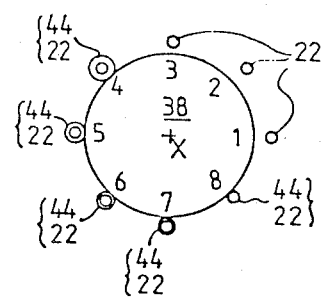
FIG. 8 is a view similar to the preceding figures, showing a further variation of the device.

Since the rollers $22_3$, $22_2$ and $22_1$ do not play a part in the stretching of the film, it is not necessary to drive them and the corresponding pinions can be dispensed with and the said rollers can be simply "freely" mounted in the side plates 24 and 26 (FIG. 8).

The variator 18 can be of the manual or motorised type controlled in respect of the running off by a process connected with the use of the stretched film.

The rollers preferably have tangential speeds which are graduated. In this respect, it will be noticed that the solution (FIG. 6) in which the pinions 44 all have the same diameter d and the rollers 22 have different diameters $D_1$, $D_2$ ... $D_n$ is advantageous.

Similarly, the rollers are preferably coated with a material having a high friction coefficient vis à vis the material of the film, as, for example, rubber or a polyethylene. In fact, it is advisable to take into account the fact that the film is in contact with each roller over a relatively limited angular sector.

The device also preferably (FIG. 10) comprises additional means for the adhesion of the film on the rollers 22. The said means are formed for example by at least one additional roller 50 which is freely mounted adjacent to a roller 22, with the axes of the said means parallel to those of the rollers 22 and supported by the frame 12, directly or indirectly arranged—with respect to the film 20—on the opposite side of the rollers 22, arranged such that the film 20 is applied to the adjacent roller 22 over a larger circular arc than if the roller 50 did not exist. A roller 50 is preferably provided between two adjacent rollers 22. The roller 50 is thus arranged such that the film, instead of being linear between the two rollers 22, is curved, on account of the roller 50, with a convex arc facing the axis XX.

In a variation, the said rollers 50 are mounted with displaceable axes in order that they can be removed from the side plates 24 and 26 and from the rollers 22, such that the relative position of all the rollers 22 with respect to the rollers 50 can be modified, which makes it possible to vary the degree of stretching of the device.

Similary, the two return rollers 51 of the film 20 are brought together so that the contour of the film 20 advantageously approximates an $\Omega$ and not a U (with an incurved base) (FIG. 4).

Finally, and similarly in a variation (FIG. 10), the film 20 may issue from a spool 53 disposed in the inside per se of the empty cylindrical space defined by the rollers 22. The input 20e of the film may thus be between two rollers 22. This arrangement has the advantage of considerably reducing the overall bulkiness of the device. Consequently, means are provided for supporting the spool 53 with the axis XX.

Furthermore, the arrangement of the rollers may differ from the usual arrangement at regular intervals about a common axis as shown. It is possible to arrange the drive rollers 22 in a line (FIG. 9) and to provide a series of interposed free rollers 23, which can be sequentially introduced between the drive rollers in a manner so as to bring the film gradually into contact with 2, 3, 4 ... etc. ... rollers driven according to the desired stretching ratio.

Beyond all these variations, the important aspect of the invention resides in the fact that the stretching is effected using rollers which are driven at different tangential speeds, there being at least three rollers, and it is possible to select as required the number of rollers in engagement with the film, so that different stretching ratios are obtained according to the choice of rollers engaged.

In a general sense, the invention relates to all systems having n rollers driven at tangential speeds $V_1$, $V_2$, $V_3$, $V_i$, ..., $V_n$ comprising means for engaging p rollers, in the order $i+1$ to $i+p$, with the film and wherein the tangential speeds are such that $$V_n > V_{n-1} > \ldots > V_n = \ldots = V_1 1.$$

The device described above has been described in the case where it is fixed throughout and is vertical. It goes without saying however that it may be arranged horizontally or inclined or so as to be displaceable throughout, for example mounted on a vertically displaceable carriage of a packing machine.

What is claimed is:

1. A method for continuously stretching plastic material, comprising the steps of:
    rotating at least three rollers at respectively increasing tangetial speeds; and automatically and selectively engaging at least two of the rollers with a stretchable plastic material to control the rate of stretching for the plastic material, said rollers being driven by a single-speed transmission.

2. The method of claim 1, wherein the rotating comprises the step of:
connecting the rollers with one drive linkage to rotate the rollers.

3. The method of claim 2, wherein the step of rotating comprises the step of:
rotating the rollers at different tangential speeds.

4. The method of claim 2, wherein the step of rotating comprises the step of:
rotating the rollers at the same tangential speed.

5. The method of claim 1 wherein the step of rotating comprises the steps of:
rotating at least two of the rollers
at the same tangential speed.

6. Method according to claim 1, characterized in that all the rollers are driven at different tangential speeds.

7. Method according to claim 1, characterized in that all the rollers are driven at the same tangential speed.

8. Method according to claim 1, characterized in that at least two of the rollers are driven at the same tangential speed.

9. Device for continuously stretching a plastic material film comprising:
at least two successive rollers with successive drives;
a third roller, the three rollers being driven at the same tangetial speed V; and
means for automatically and selectively engaging any number of rollers with the film to be stretched.

10. Device according to claim 9, wherein: there are n said rollers driven at the tangential speeds $V_1 < V_2 < V_3 < V_4 \ldots < V_n$.

11. Device according to claim 10, wherein: the means for selectively engaging are arranged for engaging a plurality of rollers in the order i to $i+(p-1)$.

12. Device according to claim 10 wherein: the rollers are arranged at regular intervals around a motor wheel having an axis and are driven by the wheel by means of pinions which are integral with the rollers and which mesh with the wheel.

13. Device according to claim 12, wherein: the rollers all have the same diameter and the pinions have different diameters.

14. Device according to claim 12, wherein: the pinions all have the same diameter and the rollers have different diameters.

15. Device according to claim 12, wherein a path which is approximately semi-cylindrical is provided around the axis and the rollers for the film.

16. Device according to claim 15, further comprising: means for increasing the adhesion of the film on the rollers comprising at least one intermediate roller arranged so as to apply the film onto a roller over a larger circular arc.

17. Device according to claim 16, further comprising: means for supporting a spool with the axis.

18. Device according to claim 17, further comprising: two return rollers for selectively moving close to one another such that the path of the film approximates an $\Omega$.

19. Device according to claim 16, wherein: the rollers are mounted with displacable axes in order that they may be removed from the path.

20. Device according to claim 6, wherein: the means for selectively engaging are arranged for engaging a plurality of rollers in the order i to $i+(p-1)$.

21. Device according to claim 11, wherein: the rollers are arranged at regular intervals around a motor wheel having an axis and are driven by the wheel by means of pinions 22. Device according to claim 10, wherein: the rollers are arranged at regular intervals around a motor wheel having an axis and are driven by the said wheel by means of pinions which are integral with the rollers and which mesh with the wheel.

23. Device according to claim 11, wherein: the rollers are arranged at regular intervals around a motor wheel having an axis and are driven by the said wheel by means of pinions which are integral with the rollers and which mesh with the wheel.

24. Device according to claim 21, wherein: the rollers all have the same diameter and the pinions have different diameters.

25. Device according to claim 22, wherein: the rollers all have the same diameter and the pinions have different diameters.

26. Device according to claim 23, wherein: the rollers all have the same diameter and the pinions have different diameters.

27. Device according to claim 21, wherein: the pinions all have the same diameter and the rollers have different diameters.

28. Device according to claim 22, wherein: the pinions all have the same diameter and the rollers have different diameters.

29. Device according to claim 23, wherein: the pinions all have the same diameter and the rollers have different diameters.

30. Apparatus for automatically controlling the rate of stretching in device for continuously stretching plastic material, comprising:
a frame;
means for supplying rotary motion, secured to the frame;
a transmission means connected to the means for suppying rotary motion;
stretching apparatus for continuously stretching plastic material, comprising at least three radially aligned rollers, wherein at least two of the rollers have means for rotating at different tangential speeds, a drive wheel intermediate the rollers and the transmission, for communicating the rotary motion, aligning means for maintaining the rollers in radial alignment about the wheel; and a variator secured to the frame for rotating the aligning means and thereby rotating the alignment of the rollers to control the rate that the plastic material is stretched; and
means for engaging the stretching apparatus with the plastic material, adjacent the stretching apparatus.

31. The apparatus of claim 30, wherein the rollers having means for rotating at different tangential speeds are rotated at the same angular speed.

32. The apparatus of claim 30, wherein the rollers having means for rotating at different tangential speeds are rotated at different angular speeds.

33. The apparatus of claim 30 wherein the means for engaging the stretching apparatus with the film comprises a path for the plastic material to intersect the stretching apparatus, the path being of an approximately semi-cylindrical form.

34. The apparatus of claim 33, wherein the means for engaging the stretching apparatus with the film further comprises: at least one adhesion roller, rotatably mounted adjacent the stretching apparatus, to increase contact between the plastic material and the stretching apparatus.

35. The apparatus of claim 34, wherein the means for engaging the sretching apparatus with the film further comprises: return rollers, rotatably mounted adjacent the stretching apparatus, for increasing contact between the plastic material and the stretching apparatus.

36. The apparatus of claim 35, wherein at least one of the rollers rotatably mounted adjacent the stretching apparatus comprises: a displacable axis for adapting to the rotating alignment of the rollers.

37. The apparatus of claim 36, wherein the path includes: intersecting the plastic material with at least two of the rollers of the stretching apparatus.

38. The apparatus of claim 37, wherein the path includes: intersecting the plastic material with at least three of the rollers of the stretching apparatus.

* * * * *